United States Patent
Nelson et al.

(10) Patent No.: US 9,319,417 B2
(45) Date of Patent: Apr. 19, 2016

(54) DATA LEAK PROTECTION

(75) Inventors: Michael D. Nelson, North Vancouver (CA); Michael Xie, Palo Alto, CA (US)

(73) Assignee: Fortinet, Inc., Sunnyvale, CA (US)

( * ) Notice: Subject to any disclaimer, the term of this patent is extended or adjusted under 35 U.S.C. 154(b) by 154 days.

(21) Appl. No.: 13/536,062

(22) Filed: Jun. 28, 2012

(65) Prior Publication Data
US 2014/0007246 A1    Jan. 2, 2014

(51) Int. Cl.
*G06F 7/04* (2006.01)
*H04L 29/06* (2006.01)
*G06F 21/16* (2013.01)

(52) U.S. Cl.
CPC ............... *H04L 63/12* (2013.01); *G06F 21/16* (2013.01); *H04L 63/0245* (2013.01)

(58) Field of Classification Search
CPC ................................. G06F 21/00; G06F 21/10
USPC ....................................... 726/26–30
See application file for complete search history.

(56) References Cited

U.S. PATENT DOCUMENTS

| | | | |
|---|---|---|---|
| 4,616,359 A | 10/1986 | Fontenot | |
| 5,235,166 A | 8/1993 | Fernadez | |
| 5,873,022 A | 2/1999 | Huizer et al. | |
| 6,094,722 A | 7/2000 | Astola et al. | |
| 6,961,367 B2 | 11/2005 | Simic et al. | |
| 2005/0049970 A1* | 3/2005 | Sato et al. | 705/51 |
| 2010/0263060 A1* | 10/2010 | Charbonneau et al. | 726/30 |
| 2012/0300975 A1* | 11/2012 | Chalamala et al. | 382/100 |
| 2013/0091570 A1* | 4/2013 | McCorkendale et al. | 726/23 |
| 2013/0104190 A1* | 4/2013 | Simske et al. | 726/1 |
| 2014/0304827 A1 | 10/2014 | Nelson et al. | |

\* cited by examiner

*Primary Examiner* — Anthony Brown
(74) *Attorney, Agent, or Firm* — Hamilton, DeSanctis & Cha LLP

(57) ABSTRACT

Methods and systems for Data Leak Prevention (DLP) in an enterprise network are provided. According to one embodiment a data leak protection method is provided. A network device receives information regarding a watermark filtering rule, including a sensitivity level and an action to be applied to files observed by the network device matching the watermark filtering rule. The network device scans a file attempted to be passed through the network device by locating a watermark embedded within the file and comparing a sensitivity level associated with the watermark to the sensitivity level of the watermark filtering rule. If the sensitivity levels match, then the network device performs the action specified by the watermark filtering rule.

54 Claims, 14 Drawing Sheets

400

New DLP Filter

Name

Description

Filter By        Watermark ▶

Company Identifier

Sensitivity Level   ⦿ Critical  ○ High  ○ Medium  ○ Low

Action           Log Only
                 Block
                 Quarantine User
                 Quarantine IP address
                 Quarantine Interface
                 Exempt OK              Cancel

FIG. 4

DATA LEAK PROTECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2012, Fortinet, Inc.

BACKGROUND

1. Field

Embodiments of the present invention generally relate to the field of Internet communication. In particular, various embodiments relate to a method and system for using digital watermarks to facilitate data leak protection.

2. Description of the Related Art

The digitization of information stored in an organization, such as an enterprise, has increased over the years. In addition, the distribution of content via networks has also begun to grow through information infrastructures such as the Internet. The Internet speeds the communication process; however it also makes it much easier to intentionally or accidentally send confidential document in a corporation to an unauthorized receiver. Further, it is easy to make perfect copies of the digital information via networks. All information users thus may become information transmitters.

To cope with such a situation, as a security measure, a digital watermark may be used. The digital watermark is a technology for embedding information, such as the name of a copyright holder, reproduction history and the like in data, such as an image, document, voice and the like. By embedding such digital watermark information in important data within an organization, products provided outside an organization, information leakage and its reproduction may be prevented.

SUMMARY

Methods and systems are described for Data Leak Prevention (DLP) in an enterprise network. According to one embodiment a data leak protection method is provided. A network device receives information regarding a watermark filtering rule, including a sensitivity level and an action to be applied to files observed by the network device matching the watermark filtering rule. The network device scans a file attempted to be passed through the network device by locating a watermark embedded within the file and comparing a sensitivity level associated with the watermark to the sensitivity level of the watermark filtering rule. If the sensitivity levels match, then the network device performs the action specified by the watermark filtering rule.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 4 shows a Graphical User Interface (GUI) for enforcing a watermark at the Data Leak Prevention (DLP) sensor according to an embodiment of the present invention.

DETAILED DESCRIPTION

Figure 1:
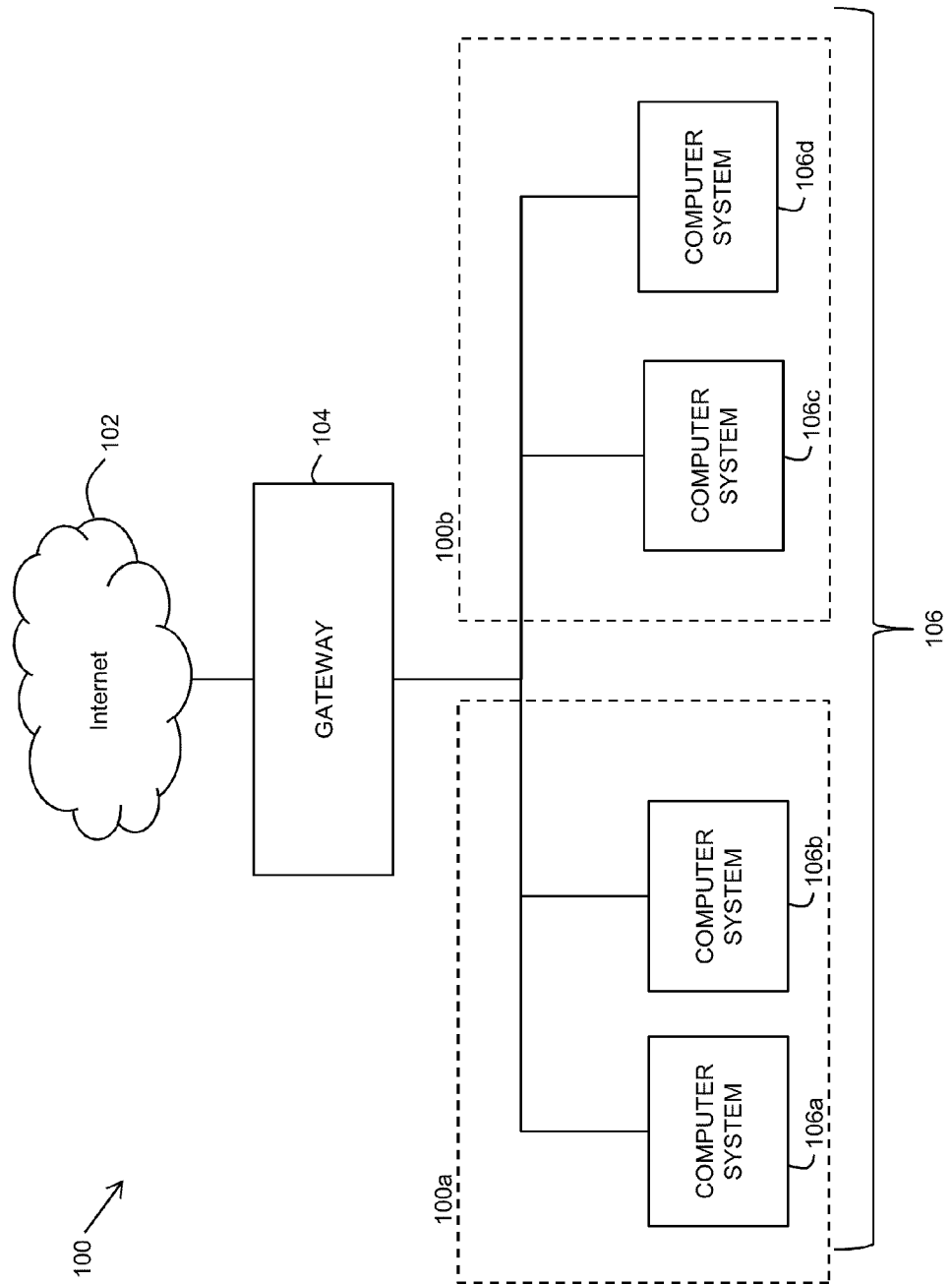
FIG. 1 is a block diagram illustrating an enterprise network in which embodiments of the present invention may be employed.

Methods and systems are described for Data Leak Prevention (DLP) in an enterprise network. To prevent accidental or intentional dissemination of confidential documents and messages to unauthorized users, it is desirable to have a DLP system that allows the transmission of such documents only to authorized personnel.

According to an embodiment of the present invention, at least one file in an enterprise network is initially analyzed for a document type. Based on this analysis, a watermark is embedded in the file. Subsequently, when the file passes through the gateway during transfer between a first computer system to a second computer system, the watermark is detected and/or extracted at the gateway. Based on this detected watermark, a DLP sensor is employed at the gateway to take an appropriate action on the file.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

The steps may be performed by hardware components or may be embodied in machine-executable instructions, which may be used to cause a general purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to networking devices (e.g., switching devices, gateway devices and firewall security devices) available from the assignee of the present invention, it is to be understood that the methods and systems of the present invention are equally applicable to networking devices manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, SonicWall, Inc. and Syntensia AB.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

The term "watermark" generally refers to information or a fingerprint embedded within a document that is indicative of one or more of a source, origin, owner or author of the document (e.g., a company, group, division, end user or other entity or person) and a sensitivity level of the document or information contained therein (e.g., critical, high, medium, low). According to one embodiment, a watermark includes plain text (a visible watermark) or encoded information (an invisible watermark) containing a company identifier and a sensitivity level. In other embodiments, the watermark is a value (e.g., a hash value) that can be used to look up the associated company identifier and sensitivity level.

FIG. 1 is a block diagram illustrating an enterprise network 100 in which embodiments of the present invention may be employed. Network 100 may represent a private or public network, such as a Local Area Network (LAN), a Wireless LAN (WLAN) or the Internet 102. In the present example, network 100 includes Internet 102, a gateway 104, and computer systems 106*a*-*d*. In an embodiment network 100*a* comprises gateway 104, and computer systems 106*a*-*b*. On the other hand, network 100*b* comprises gateway 104 and computer systems 106*c*-*d*.

In an embodiment, network 100 is an enterprise network. The enterprise network connects computer systems of network 100*a* and 100*b*, i.e. computer systems 106*a*-*b* with computer systems 106*c*-*d* into an intra company network and allows exchange of data between any two computer systems within the enterprise network.

According to one embodiment, gateway 104 is a network node for interfacing one network with another network, which may use a different protocol. For example, gateway 104 interfaces network 100*a* with network 100*b*. In an embodiment, gateway 104 also acts as a proxy server and/or a firewall server. Firewall servers are used to protect networks from unauthorized access while permitting legitimate communication to pass. Firewall servers add a level of protection between computer systems, for example 106*a*-*d* and the Internet 102, and permit or deny network transmissions based upon a set of rules. Further, firewall servers help prevent viruses and worms from entering computer systems 106*a*-*d* and hence protect the computer systems from threats. Firewall servers may further implement firewall policies to control what users of computer systems 106*a*-*d* have access to. In an embodiment, gateway 104 may also include a router. Routers are devices that forward data packets from one network to another. For example, gateway 104 forwards data packets from network 100a to network 100b.

Referring to FIG. 1, gateway 104 is connected to computer systems 106a-d. Though in FIG. 1, for the sake of illustration, four computer systems 106a-d are shown, network 100 can have more or fewer computer systems. In an embodiment, computer systems 106a-d are configured to work as client devices. In another embodiment, computer systems 106a-d are configured to work as server computers. In still another embodiment, computer systems 106a-d may comprise a combination of client devices and server computers. According to various embodiments of the present invention, computer systems 106a-d may serve as a data center to house telecommunications and storage systems. The data center may include backup power supplies, data communications connections, environmental controls and security devices. Examples of computer systems 106a-d include desktop computers, laptops, notebook computers, handheld devices, such as mobile phones, smartphones, palm-top computers, Personal Digital Assistants (PDAs), navigational units and so forth. Various applications maybe run on computer systems 106a-d. Examples of the applications include, but are not limited to, web browsers, software applications, email applications and chat applications.

In an embodiment, one or more of computer systems 106a-d may be configured by an administrator to function as a watermarking console to embed watermarks within files passing through the gateway 104. A watermarking program may be installed on one of computer systems 106a-d, such as computer system 106d to mark a target set of files/documents in the network 100 with a watermark. In one embodiment, the watermarking program is a client program and a Windows® based tool. In another embodiment, the watermarking program is a UNIX based tool. The watermarking program may operate through a Common Internet File System (CIFS) share. CIFS is an application layer network protocol used for providing shared access to files, printers, serial ports, and other communications between nodes, such as computer systems 106a-d, on a network. CIFS servers thus make their file systems and other resources available to clients on the network.

The user (e.g. an end user of a particular computer system or a network or system administrator) may run the watermarking program on a server containing the target set of files that are desired to be protected. The user configures the list of files to be marked as described further below, sets the watermark to be used and applies it to the list of files. In an embodiment, the watermarking program supports embedding watermarks within files of at least the following document types: text, PDF, Windows Office documents, such as those having .doc, .docx, .ppt and .xls file extensions, Open Office documents, Mac OS documents and source code documents, including, but not limited to those having .c, .h, .cpp, .js and .py extensions. Further, the user may also add custom document types. The embedded watermark may contain information, including, but not limited to, a company identifier (which may be used to identify each user's installation) and a built-in sensitivity level (e.g., critical, high, medium and low).

In an embodiment, the watermarking program is operable as part of an offline tool project with a user interface and a feature list. In another embodiment, the watermarking program includes a web-based user interface.

In addition to causing the desired files to be watermarked, the user also configures a DLP sensor at the gateway 104. The DLP sensor is a module that is capable of detecting watermarks in files and/or extracting the information contained in the watermark and the file. The user may log into the gateway 104 and configure the DLP sensor to detect a particular watermark and responsive to the detection perform a specified action. The action may include either blocking or passing the file at the gateway 104, when files containing the particular watermark are received by (attempted to be transferred through) the gateway 104.

It should be noted that, for the sake of illustration, in the above embodiment, one of the computer systems 106a-d is configured to work as a watermarking console. However, it should be apparent to a person ordinarily skilled in the art that an external client device (not shown) or other internal computer system (not shown) may perform the watermarking embedding functions. Additionally, although the network has been described as an enterprise network, any other network may also use the features described herein.

In an exemplary embodiment of the present invention, gateway 104 may be a FORTIGATE gateway available from Fortinet, Inc. of Sunnyvale, Calif. (FORTIGATE is a trademark or registered trademark of Fortinet, Inc.).

Figure 2:
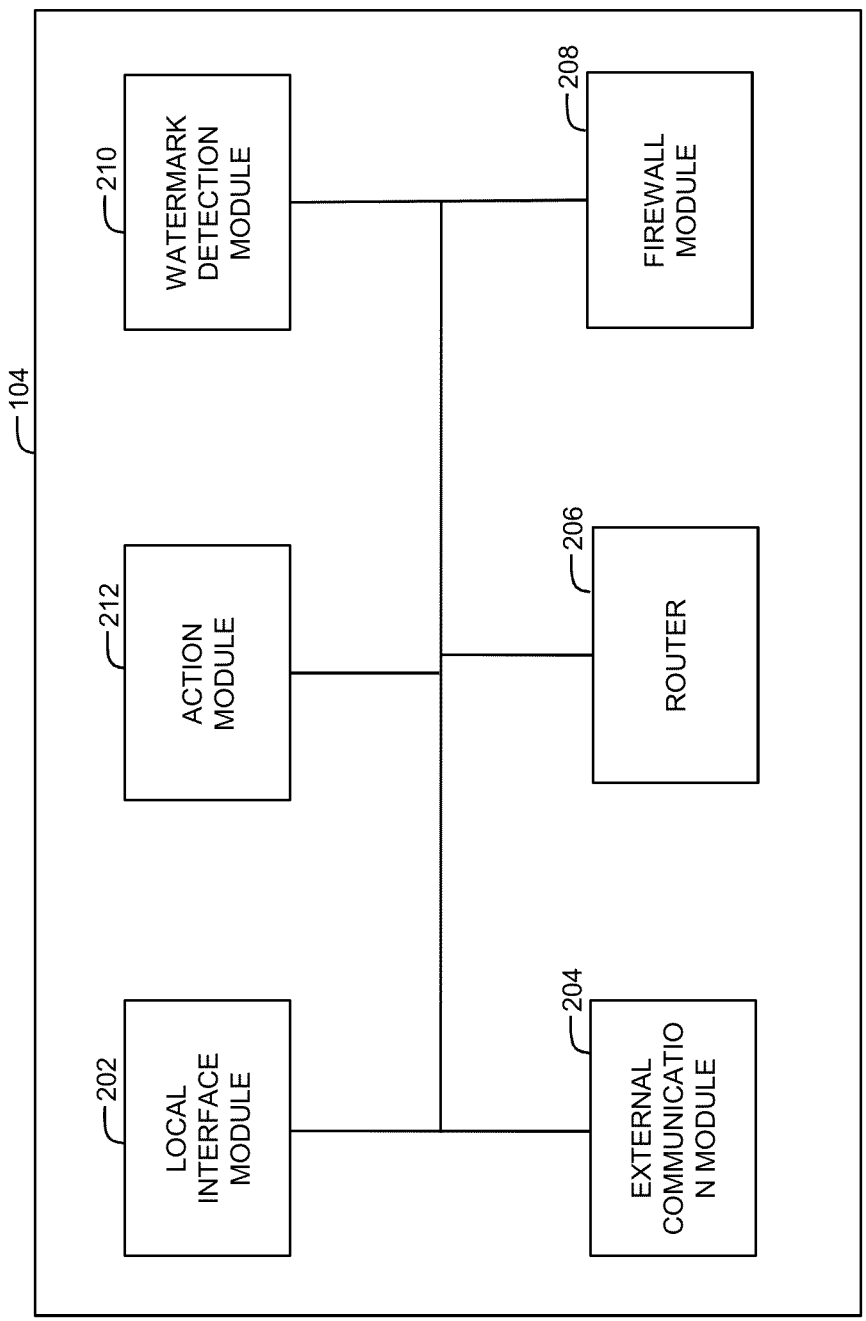
FIG. 2 is a block diagram conceptually illustrating interaction among various functional units of a gateway in accordance with an embodiment of the present invention.

FIG. 2 is a block diagram conceptually illustrating interaction among various functional units of gateway 104, in accordance with an embodiment of the present invention. Gateway 104 includes a local interface module 202, an external communications module 204, a router 206, a firewall module 208, a watermark detection module 210, and an action module 212.

According to one embodiment, the local interface module 202 provides a physical and data-link layer communication interface with one or more computer systems, such as computer systems 106a-d. Local interface module 202 accepts and provides IP packets over an internal data path and interfaces with the network link. The external interface module 204 accepts and provides IP packets over data paths from and to other modules in the gateway, and provides physical and data-link layer interfaces to a communication link that couples the gateway 104 to the external network.

Further, the external communication module 204 is coupled to the router 206. Router 206 accepts IP packet from a number of data paths within the gateway 104, and routes those packets to other data paths. For example, router 206 accepts IP packets over a data path from the local interface module 202. Furthermore, router 206 is connected to firewall module 208. Firewall module 208 adds a level of protection between computer systems 106a-d, and permits or denies network transmissions based upon a set of rules. The rules are run and the outcome is then communicated by the firewall module 208 to the external communications module 204 and an action is taken accordingly.

Gateway 104 further comprises a watermark detection module 210. In an embodiment, the watermark detection module 210 is capable of detecting a watermark in the files passing through the gateway 104. Watermark detection module 210 detects and/or extracts watermark information (e.g., a company identifier and a sensitivity level) embedded within the files by a watermarking program, for example. In another embodiment, the watermark detection module 210 is capable of analyzing various parameters of a file, such as file type, file size and the like. In yet another embodiment, watermark detection module 210 is capable of detecting the presence of particular words, word types in the file passing through the gateway 104.

According to an embodiment, watermark detection module 210 includes a package of DLP rules. Traffic passing through the gateway 104 is searched for patterns defined by the DLP rules (as described below with reference to FIGS. 9 and 10). Based on the matching traffic and how the DLP rules are defined, action module 212 takes an appropriate action on the file, such as blocking the file at the gateway 104, allowing the file to pass through the gateway 104, logging the traffic and/or the like.

According to various embodiments of the present invention, the functional modules can be any suitable type of logic (e.g., digital logic) for executing the operations described herein. Any of the functional modules used in conjunction with embodiments of the present invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 3:
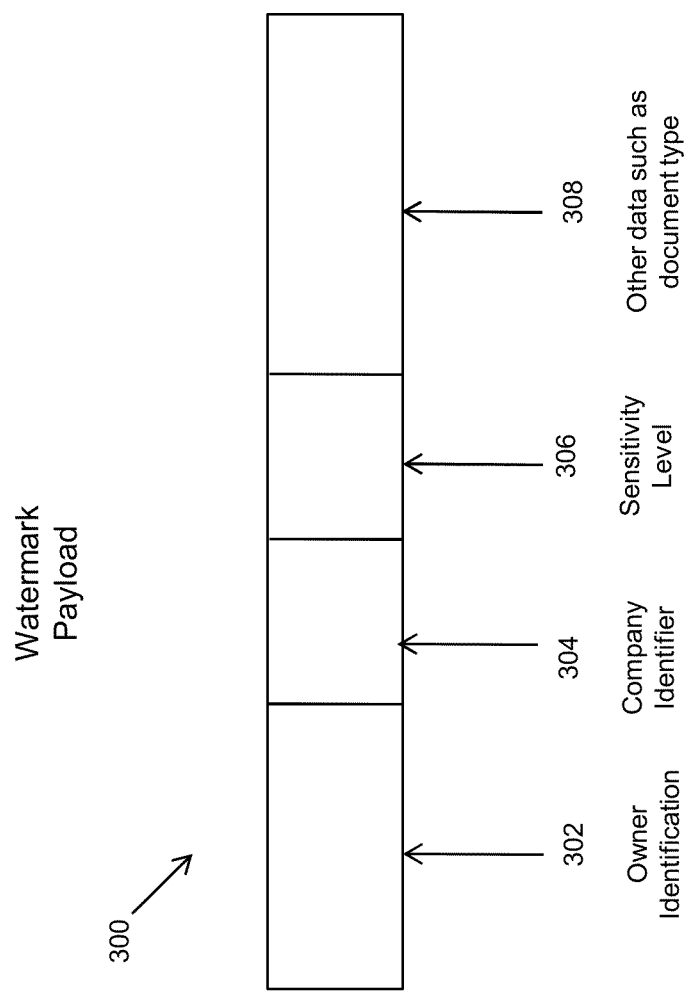
FIG. 3 is a diagram illustrating various fields in a watermark according to an embodiment of the present invention.

FIG. 3 is a diagram illustrating various fields in a watermark 300 according to an embodiment of the present invention. In the present example, the watermark 300 is a series of characters that depend on some input parameters. The watermark 300 includes fields such as owner identification 302, a company identifier 304, and a sensitivity level 306. Owner identification 302 is used to identify each user's installation. In an embodiment, different users use the same feature and it is hence possible to watermark the file multiple times. Further, the watermark 300 also includes company identifier 304, such as corporate name, and built-in sensitivity level 306. In an embodiment, the sensitivity level 306 may be chosen from critical sensitivity, high sensitivity, medium sensitivity, low sensitivity, and the like. In an embodiment, depending on the sensitivity level 306 embedded in the watermark 300, the gateway 104 takes a specified action on the file within which the watermark 300 is embedded.

Optionally, watermark 300 may also include field 308 for carrying other data such as type of document, number of flags to indicate actions that should be taken for a particular document and the like. It should be understood that the fields shown are merely representative and may take many alternative forms.

In an embodiment, a watermark is embedded within a document or file at each point of distribution. If the document is found later, the watermark may be retrieved and the source of distribution may be ascertained. This helps in source tracking and the path the document has followed.

Further, a watermark may be embedded within an individual document or a whole directory of documents. In an embodiment, the way a watermark is embedded into a document depends on the type and structure of the document at issue. For example, a watermark is embedded within a PDF document in a different manner than a watermark is embedded within a .docx document and so on. Further, the watermark should be embedded in a manner that does not interfere with typical usage of the document or file. Information regarding Those skilled in the art will appreciate watermarks may be embedded in a similar matter in other file formats.

According to an embodiment, a visible watermark is embedded by a watermarking program in a document or a list of documents. The visible watermark may be added in the form of plain text containing the various data fields described above. In another embodiment, the visible watermark is a binary watermark in the form of encoded and/or encrypted text.

In another embodiment, the watermark embedded in the document as an invisible watermark. According to an embodiment, an invisible watermark may be generated based on a watermark string, such as watermark 300 by running an MD5 checksum on the watermark 300 and then embedding the resulting checksum (instead of the string) within the file to be watermarked. The MD5 Message-Digest algorithm is a cryptographic hash function that produces a 128-bit hash value, and is used to check data integrity, but in this case it serves as an identifier of the original watermark string that can be used as an index into a table of configured watermarks and corresponding actions stored on a gateway device, e.g., gateway 104.

It should be apparent to a person ordinarily skilled in the art that various other techniques of adding watermarks may be used in the above examples. Further, when a watermark is added to the document, the watermark does not affect the file coding of the document.

In one embodiment, a command line client program is used to insert watermarks into documents. The client program may have the following usage:

```
./watermark <options> -f <file name> -i <identifier> -l <sensitivity level>;
or
./watermark <options> -d <directory> -i <identifier> -l <sensitivity level>
```

Options:
- -h print help
- -v verbose information
- -I in-place watermarking (i.e., don't copy the file)
- -o output directory
- -e encode <to non-readable (invisible watermark)>
- -a add additional watermark (by default replaces existing watermarks)
- -D delete all watermarks In one embodiment, the watermark that gets inserted into files at its base level could look something like the following: =-=-=-=-=-=-=identifier=<corpidentifier>sensitivity=<sensitivity>=-=-=-=-=-=-=

So, if the -e (encode) option is not used, this is what the gateway would be looking for. If -e is used, then a Fowler-Noll-Vo hash function (e.g., FNV1 checksum) or a message-digest algorithm (e.g., MD5), for example, may be run on the watermark content to make it into a 64-bit or 128-bit number, which would be inserted into the document(s) at issue and searched for by the gateway. Notably, some file types require "readable" text, not arbitrary digits. For these, the 64-bit or 128-bit encoded number can be converted to Base-64 encoding.

According to one embodiment, the client program identifies the file type based on the file name. If a file has an un-supported file extension, that can be reported on the console; otherwise, the watermark is generated and inserted into the designated file(s). At a minimum, inserting a watermark should still allow the file to be read. Ideally, the watermark should be invisible to the user, and also should be retained after a file is edited and saved.

For simple text files (e.g., *.txt), the options for inserting a watermark are limited as there is nowhere to hide meta information. As such, in one embodiment, the watermark is simply appended to the end of the file. Depending on the "encoding option" either the original watermark or the "printable" MD5 checksum can be inserted so it doesn't look garbled.

For PDF files, they are broken into sections. There are also multiple cross-reference tables to find the start and end of the section. In one embodiment, to insert a watermark, the following steps may be performed:

Find the last xref (cross reference table).
Insert the watermark section immediately before the xref table in its own section, for example, as follows (Note: The contents of the section will be ignored by PDF readers since they don't know what to make of the /Watermark tag):

```
<id> 0 obj
<<
/WaterMark <watermark text or encoded>
>>
endobj
```

Add a new part to the xref table with this new section, for example, as follows:

```
<id> 1
<offset of new section> <size of new section>
```

Update the file trailer to the new location of the xref table.

For old Microsoft office documents (e.g., *.doc, *.xls and *.ppt), they use a proprietary meta-file system. According to one embodiment, to watermark these files, a 512 "page" containing the watermark is simply appended to the end of the file. MS office and other readers will ignore this section when displaying the file.

For new Microsoft Office documents (e.g., *.docx, *.xlsx and *.pptx), the file format is actually a zip file containing XML files. Since the format is known, a custom property with the watermark in it can be inserted in the document. In one embodiment, a library that can read files from a zip or write to a zip may be used by the client program. The client program opens up the original file, and goes through each file within the zip looking for the docProps/custom.xml file. If this file exists, a new property tag may be added within the XML file at the end of the <Properties> . . . </Properties>section, for example, as follows:

```
<property fmtid="{D5CDD505-2E9C-101B-9397-08002B2CF9AE}" pid="2" name=\"watermark1\"><vt:lpwstr>{watermark string}</vt:lpwstr></property>
```

In the above example, { } has been used instead of < > for the boundary of where the watermark string goes. Note that the watermark should be a readable string in this context, so the client program would use the base 64 version, not the encoded binary version if the "-e" option was used.

To detect the above-described watermarks, the gateway, e.g., gateway 104, takes the sensitivity level and the corporate identifier from the DLP filter, and builds up the watermark string, and encodes it with FLV1, for example, and base-64 encodes that. Then, as files are passed through the gateway, it searches each file for each of these encodings within its content. In the case of new MS Office documents, the gateway will unzip the file and scan each member file for one of these.

FIG. 4 shows a Graphical User Interface (GUI) 400 for enforcing a watermark at the Data Leak Prevention (DLP) sensor according to an embodiment of the present invention. The DLP sensor may comprise a combination of watermark detection module 210 and action module 212. GUI 400 illustrates a method of facilitating creation of a DLP filter. In general, a DLP filter is a rule containing various data fields, e.g., Name, Description, Filter, Company Identifier, Sensitivity Level, and Action. Based on these filters/rules defined for the DLP sensor at the gateway 104, an action is taken accordingly.

A brief description of various exemplary data fields that may be part of a DLP filter follows:

Name: Name of the rule

Description: a textual description of the particular rule/filter

Filter: It defines on what basis the files are to be filtered on by the gateway. For example, in the context of the illustrated embodiment, the files would be filtered on the basis of the watermark, i.e., detection and/or extraction of a watermark from the files passing through the gateway is performed. This may include the sensitivity level embedded in the watermark. For example, an action may be performed on the file passing through the gateway only if the sensitivity level of the file is Critical.

Further, the files may also be filtered based on the type of file/document i.e. PDF, .doc, .xls etc, the size of the file/document, and/or the presence of certain words in the content of the file as described below with reference to FIG. 9.

Company Identifier: According to one embodiment, when a user selects the filter to be based on 'Watermark', this field is added as a sub-field to the Watermark tab. This section contains information related to the company such as Corporate name, Corporate ID or the like. This information typically uniquely identifies a company or entity.

Sensitivity Level: This field contains the sensitivity level in which the file passing through the gateway is categorized under. In an embodiment, the sensitivity level is set to one of Critical sensitivity, high sensitivity, medium sensitivity, and low sensitivity.

Action: This field defines an action to be taken on the file passing through the gateway 104, when a DLP filter established on the gateway matches a watermark embedded within a file observed by the gateway. Various actions that may be taken on the file including, but not limited to, Log only (logging an event), Block (blocking the file), Quarantine user (Block based on authenticated user), Quarantine IP address (Block sender IP address), Quarantine Interface (block all traffic from that networking interface on the gateway) and Exempt.

It should be apparent to a person ordinarily skilled in the art that the above-defined fields are merely exemplary, and other fields may be added or removed from the above mentioned list without deviating from the scope of the invention. For example, another field could be used to differentiate between intra-enterprise traffic and traffic intended for a destination external to the enterprise network.

The above mentioned filters/rules are defined at the DLP sensor and stored in an associated database. In an embodiment, when a file passes through the gateway 104, the DLP sensor detects the watermark contained in the file and/or extracts the information contained in the watermark such as Company Identifier, and sensitivity level. Based on this detected watermark, the information is compared to the rules defined at the DLP sensor, and when there is a match, the associated action is performed.

For example, assume a DLP filter is defined at the DLP sensor for Company identifier 'ABC' and Sensitivity Level 'Critical'; and the associated action defined under these parameters is 'Quarantine User'. Subsequently, when computer system 106a, for example, tries to send a file with the watermark information containing 'ABC, Critical' to computer system 106b, for example, gateway 104 locates the watermark information embedded within the file, compares it to the rule database and upon determining a the existence of a matching DLP filter, blocks the file from being transferred as well as subsequent file transfers from computer system 106a until a system or network administrator can investigate the situation, for example.

It should be noted that the above is merely a simplified example of a rule combination that could be in a database of the DLP sensor. The database could include more rules.

Figure 5:
FIG. 5 shows a Graphical User Interface (GUI) for viewing file filters of a DLP sensor according to an embodiment of the present invention.

FIG. 5 shows a Graphical User Interface (GUI) 500 for viewing file filters of a DLP sensor according to an embodiment of the present invention. In an embodiment, a remote management system for an enterprise network contains a GUI with the menu layout as depicted in GUI 500. GUI 500 comprises various tabs such as System, Router, Policy, Firewall Objects, and UTM Security Profiles. When a user selects UTM Security Profiles à Data Leak Prevention à File Filter, file filter main table 502 is displayed. The existing file filters and their corresponding entries are displayed in the main table. In an exemplary embodiment, file filters 'all_executables' and 'all_archives' are displayed.

In an embodiment, there exists a pre-defined entry for a factory default, e.g., all_executables. This entry may contain all the file name patterns and built-in file patterns. These file types and file patterns are then examined/scanned for a watermark when they pass through the gateway 104.

Figure 6:
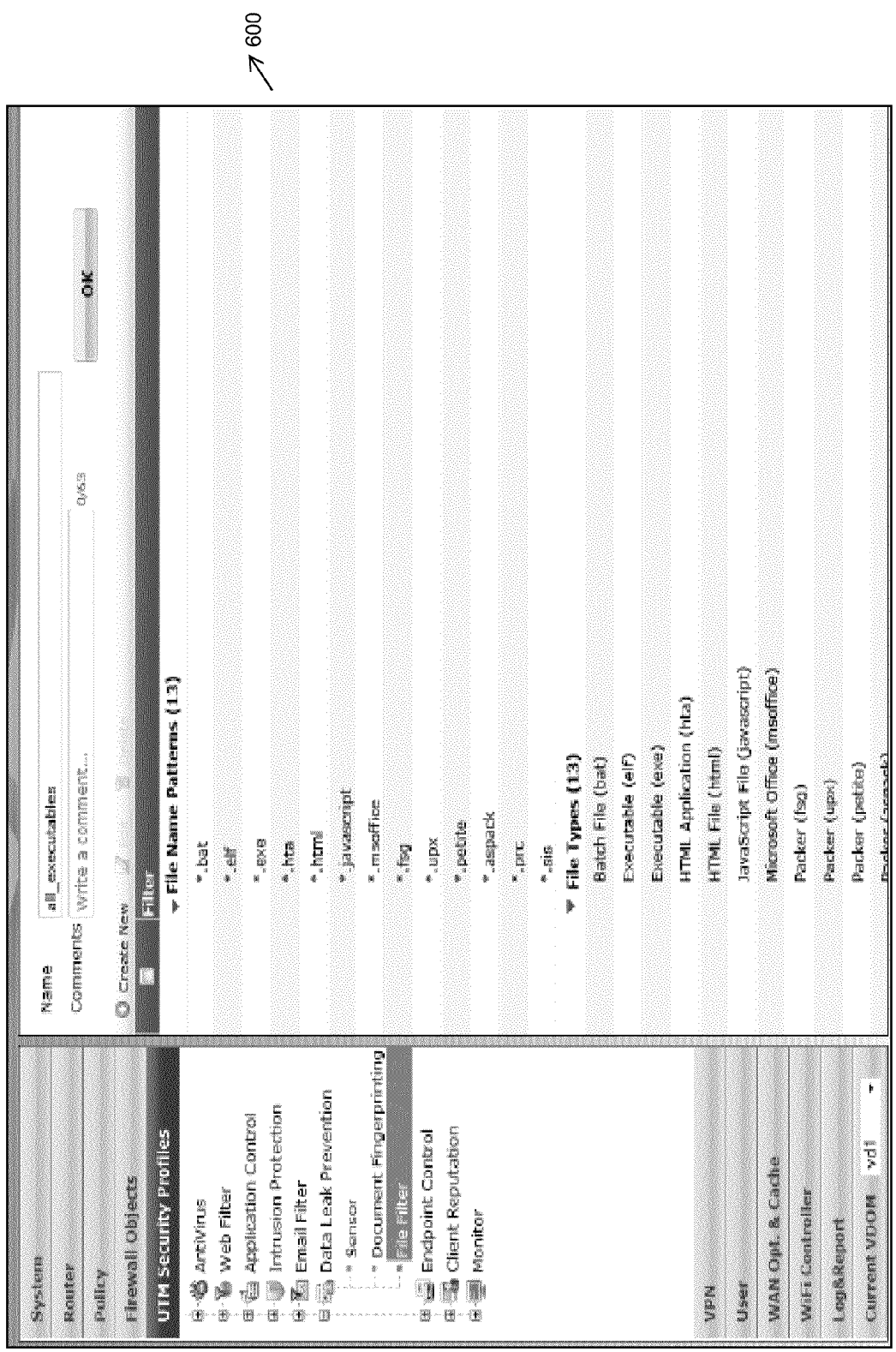
FIG. 6 shows a Graphical User Interface (GUI) for viewing/editing a file filter of a DLP sensor according to an embodiment of the present invention.

FIG. 6 shows a Graphical User Interface (GUI) 600 for viewing/editing file filters of a DLP sensor according to an embodiment of the present invention. When a user selects one of the entries in the file filter main table 502 of GUI 500, a page similar to GUI 600 may be displayed. GUI 600 displays the name of the selected file filter and all file name patterns and file types associated with that file filter. For example, when a user selects 'all_executables' in the main table 502, GUI 600 may be displayed with the file name patterns and file types that lie under all_executables. Examples of file name patterns include, but are not limited to, *.bat, *.elf, *.exe, *.hta, *.html, *.javascript, *.msoffice, *.fsg, *.upx, *.petite, *.aspack, *.prc, and *.sis. The corresponding file types of these patterns may also be displayed, such as, Batch file (bat), executable (elf), executable (exe), HTML application (hta), HTML file (html), JavaScript file (javascript), Microsoft office (msoffice), packer (fsg), packer (upx), packer (petite), packer (aspack), and so on.

Figure 7A:
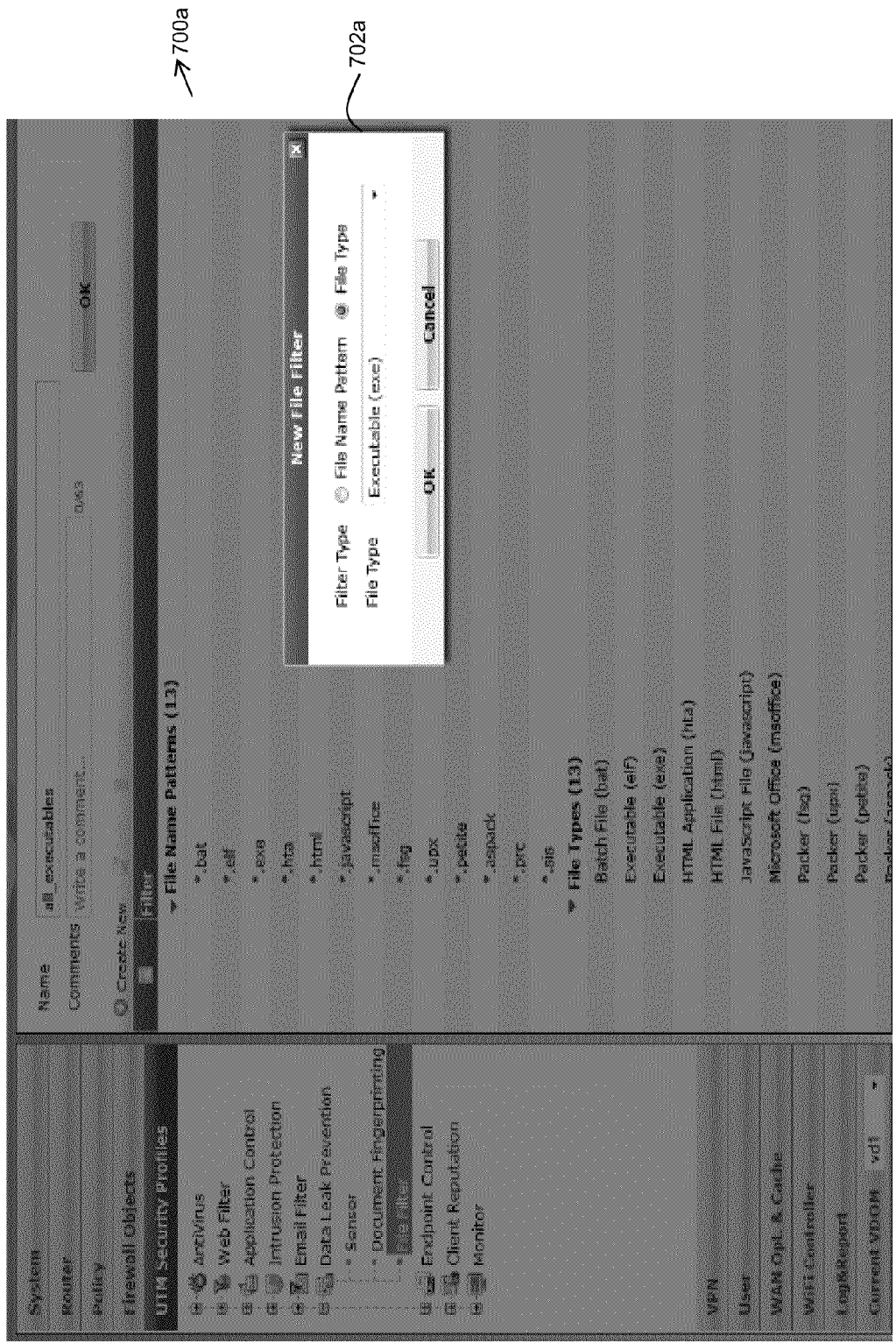
FIGS. 7A and 7B show a Graphical User Interface (GUI) for creating new file filters for a DLP sensor according to an embodiment of the present invention.
Figure 7B:
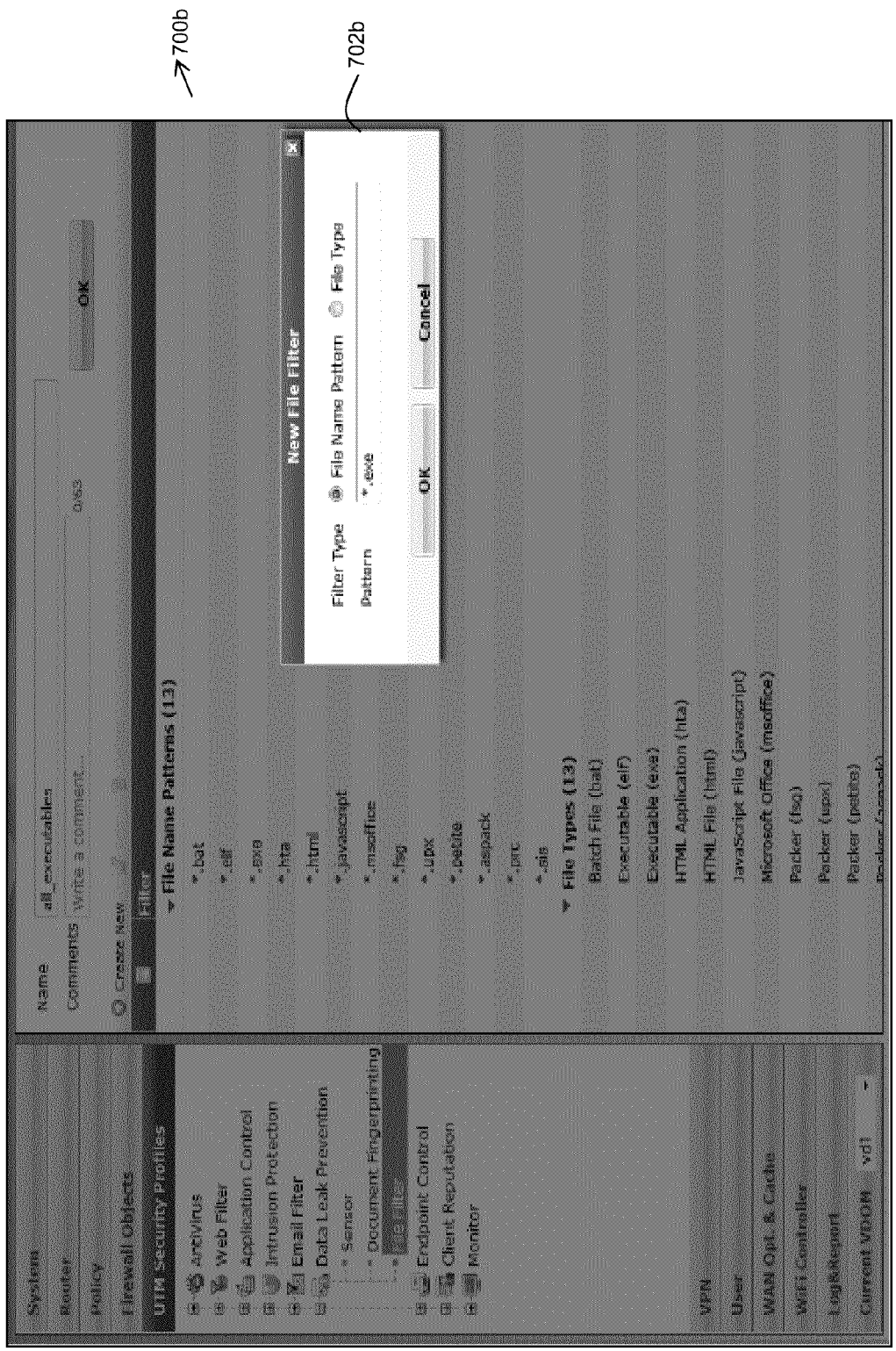

FIGS. 7A and 7B show a Graphical User Interface (GUI) for creating new file filter for a DLP sensor according to an embodiment of the present invention. When a user selects the 'Create New' button on GUI 600, a dialog box similar to dialog box 702a may be displayed on a screen of a computer. The dialog box 702a asks a user for the type of file filter the user wishes to create: based on File name pattern or based on File Type.

FIG. 7A depicts dialog box 702a for creating a file filter based on File type. The corresponding File type is entered in the dialog box 702a below. In an embodiment, the file type is selected from a drop down menu. In another embodiment, a custom file type or file type not present in the list may also be added. In an exemplary embodiment shown in FIG. 7A a new file filter for file type Executable (exe) is added.

FIG. 7B depicts dialog box 702b for creating a file filter based on File Name Pattern. The corresponding File Name Pattern is entered in the dialog box 702b below. In an exemplary embodiment shown in FIG. 7B a new file filter for file name pattern *.exe is added.

Figure 8:
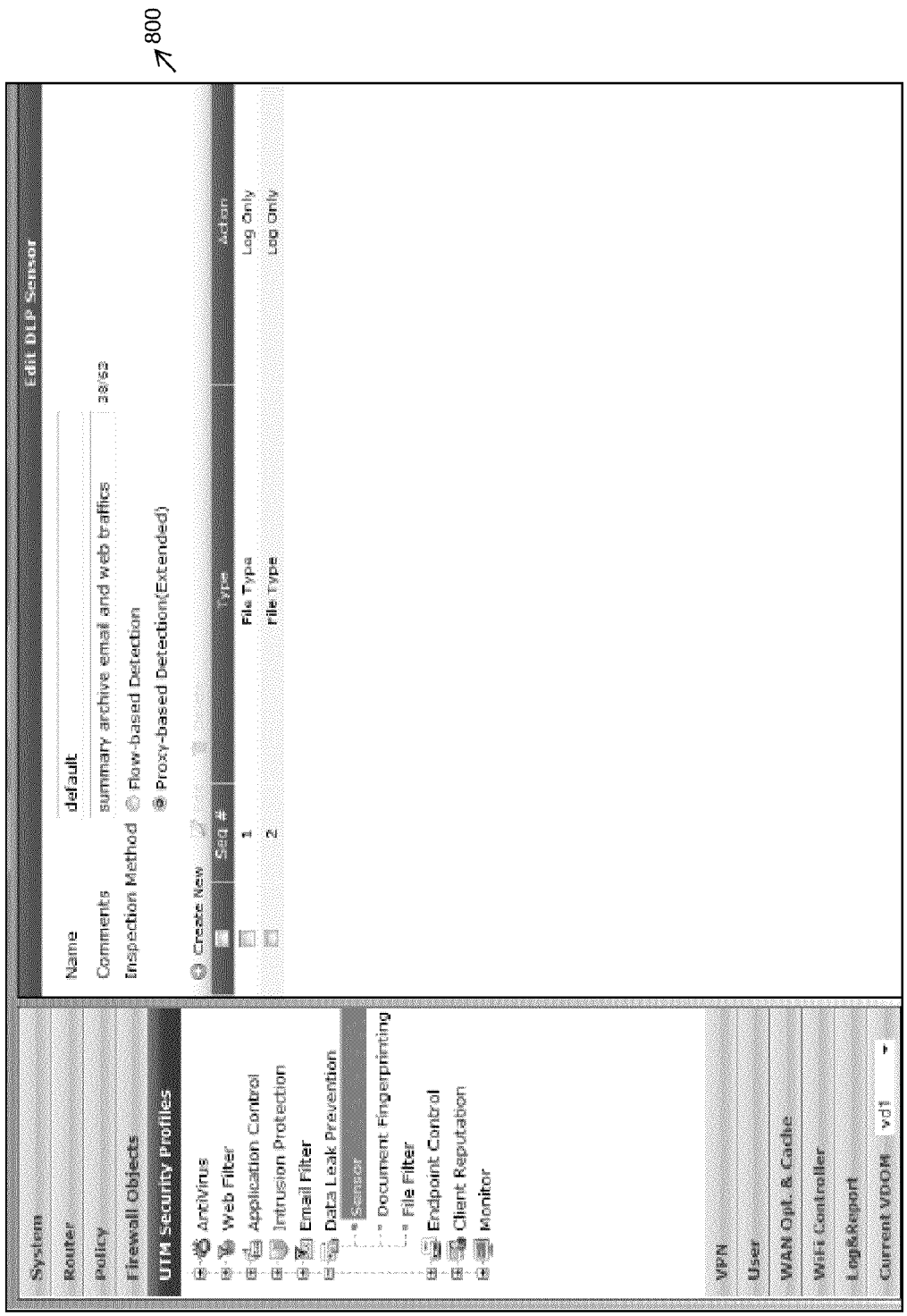
FIG. 8 shows a Graphical User Interface (GUI) for a DLP sensor according to an embodiment of the present invention.

FIG. 8 shows a Graphical User Interface (GUI) for a DLP sensor according to an embodiment of the present invention. When a user selects UTM Security profiles à Data Leak Prevention à Sensor, a page similar to GUI 800 may be displayed. GUI 800 shows the DLP Sensor Main table containing the existing rules/filters applicable at the DLP sensor and the type of inspection method used: Flow-based detection or proxy-based detection.

In an embodiment, the DLP sensor rules are provided with sequence numbers. In an exemplary embodiment shown in FIG. 8, there are two sensor filters: '1' and '2'. The DLP sensor filters may be defined for 'Messages' (e.g., email or instant message content) and 'Files' (e.g., file content). The DLP sensor filters may be sorted based on Seq #, File Type or Action.

Figure 9:
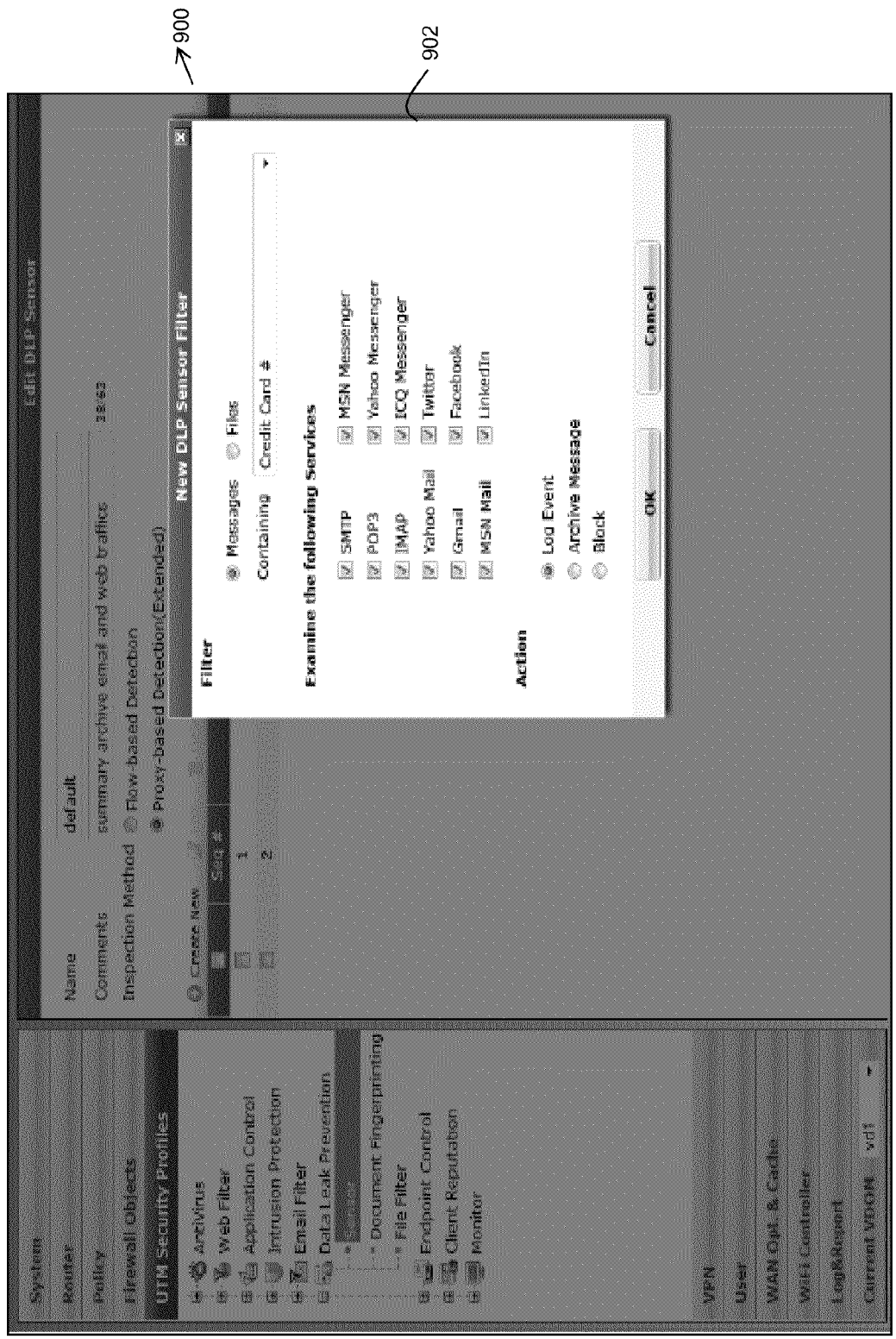
FIG. 9 shows a Graphical User Interface (GUI) for creating a new DLP sensor filter according to an embodiment of the present invention.

FIG. 9 shows a Graphical User Interface (GUI) 900 for creating a new DLP sensor filter according to an embodiment of the present invention. When a user selects the 'Create New' button on GUI 800, a dialog box similar to dialog box 902 may be displayed. The dialog box 902 asks a user if the user wishes to create a filter based on 'Messages' or 'Files'. When the user selects 'Messages', a sub-field 'Containing' is displayed to allow the user to designate the type of content to be scanned for. In an embodiment, the data entry for 'Containing' can be selected from a drop down menu including the following items: 'Any', 'Credit Card #', 'SSN', and 'Regex'. The user selects one from the drop down menu and also chooses the services for which such messages are to be examined, as shown in FIG. 9. The services include, but are not limited to, SMTP, POP3, IMAP, Yahoo mail, Gmail, MSN Mail, MSN messenger, Yahoo Messenger, ICQ messenger, Twitter, Facebook, and LinkedIn. The corresponding action, such as log event, archive message, or block the message is also selected.

For example, a new filter for 'Message' may be created containing 'Credit Card #'. Services, such as Yahoo Mail, Gmail, and Facebook, may be designated to be examined and the action log event may be selected. Subsequently, when computer system 106a sends or receives a message via Yahoo Messenger containing information that appears to be in the form of a credit card number, then that message/event is logged by the gateway 104.

Figure 10:
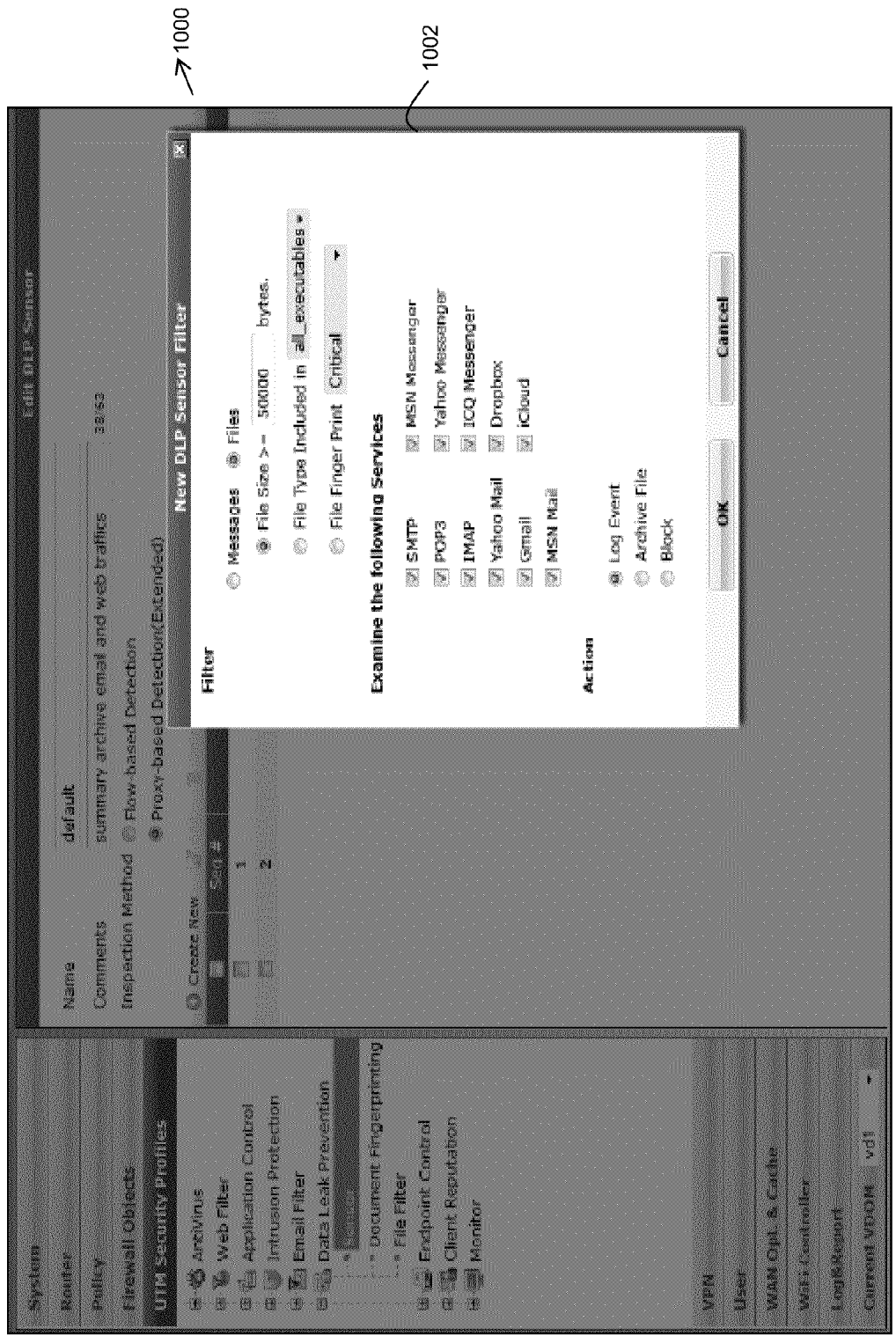
FIG. 10 shows a Graphical User Interface (GUI) for creating a new DLP sensor filter according to another embodiment of the present invention.

FIG. 10 shows a GUI 1000 for creating a new DLP sensor filter according to another embodiment of the present invention. Referring to FIG. 9, when a user selects 'Files' in dialog box 902, then a dialog box similar to 1002 may be displayed. The dialog box 1002 contains sub-fields corresponding to 'Files', such as File size, File type included in, and File fingerprint.

In an embodiment, if the size of a file is greater than, less than or equal to a particular value, then the file may be filtered by the DLP sensor at the gateway 104. In an exemplary embodiment shown in FIG. 10, if the file size is greater than or equal to 50,000 bytes, then the mentioned services are examined and an action taken accordingly.

Further, a filter may also be created for various file types. In an embodiment, 'File Type included in' contains available filters defined in the file filter main table 502 explained in FIG. 5. For example, the drop down menu of 'File Type included in' may include elements 'all_executables' and 'all_archives'.

Furthermore, a filter may also be created based on the file watermark/fingerprint detected. In an embodiment, the drop down menu of 'File Fingerprint' may include critical sensitivity, high sensitivity, medium sensitivity, and low sensitivity. Based on the watermark detected by the DLP sensor in the file passing through the gateway 104, an action is taken based on the matching DLP filter, if any.

As explained above, three individual filters for 'Files' or any combination of these 3 individual filters may be created.

After defining the basis of the filters, i.e. file size, file type or file fingerprint, the services are selected which are to be examined for these criterion, and the action defined in the filter is then taken by the gateway 104 for subsequently identified matches.

For example, a filter may be defined for file size>=50000 bytes with file fingerprint 'Critical' and the Action corresponding to 'Block'. Thereafter, the selected services are continuously monitored. When the gateway 104 detects the sensitivity level of a file passing through it to be 'Critical' having a file size of 60000 bytes, for example, that file will be blocked at gateway 104 and not allowed to be transferred to the intended destination.

Figure 11:
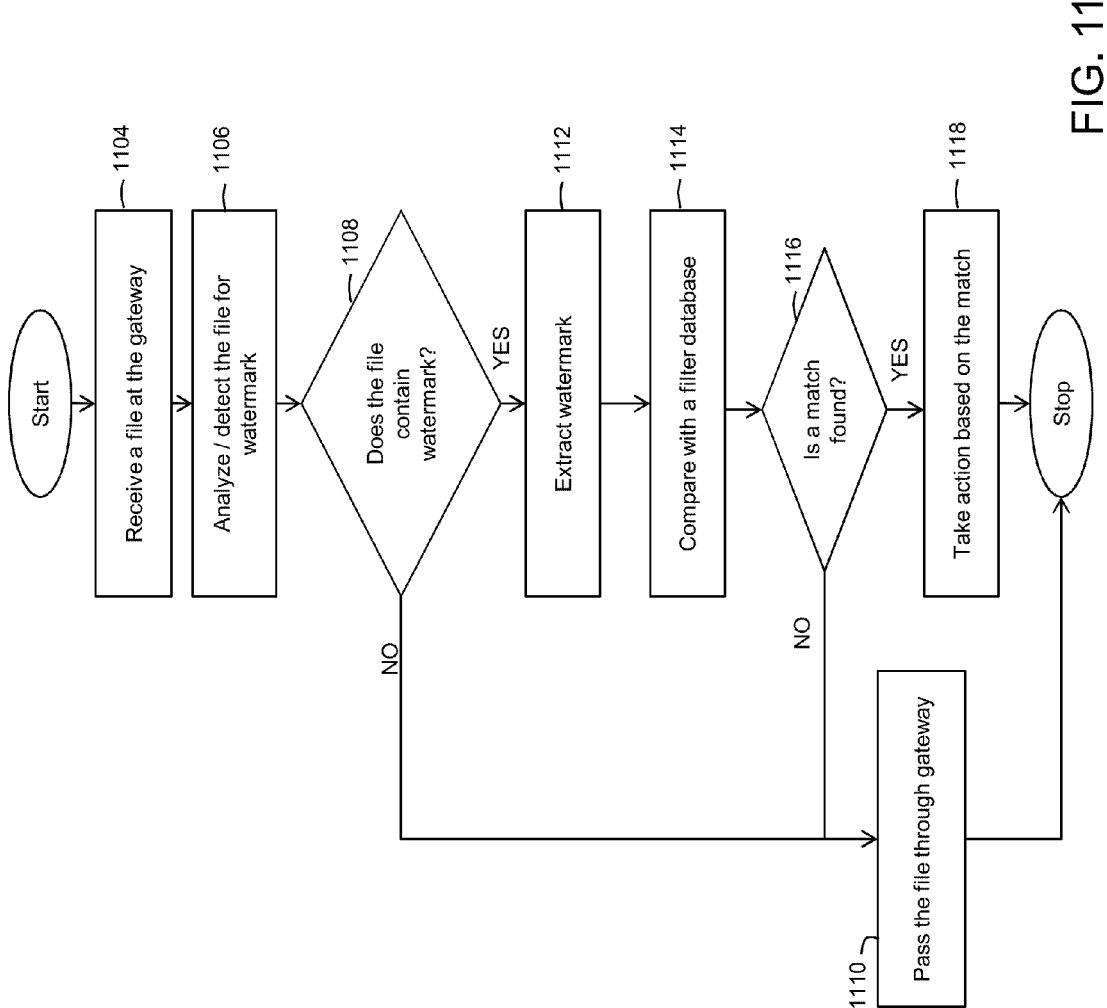
FIG. 11 is a flow diagram illustrating a method for Data Leak Prevention (DLP) in an enterprise network in accordance with an embodiment of the present invention.

FIG. 11 is a flow diagram illustrating a method for Data Leak Prevention (DLP) in an enterprise network in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 1104, a file is received at a filtering device, e.g., gateway 104. At block 1106, a watermark detection module, e.g., watermark detection module 210, analyzes the file for various parameters, such as a watermark and document type. At block 1108, it is determined if a watermark is detected by the watermark detection module 210. If a watermark is not found, then at block 1110, the file is allowed to pass through the gateway 104. However, if a watermark is detected at block 1108, then at block 1112, information regarding the watermark and document type are determined from the file. In an embodiment, the watermark contains a company identifier and a sensitivity level or a unique identifier, such as an MD5 checksum, corresponding to a company identifier and a sensitivity level, as explained with reference to FIG. 3.

At block 1114, the information ascertained by the watermark detection module at block 1112 is compared with a rules and filter database, as explained with reference to FIGS. 9 and 10, for example. At block 1116, it is determined if a match in the database is found. If a match is found, then at block 1118, an action is taken by the action module 212 according to what is defined in the matching DLP sensor filter. Various actions that can take place include blocking the file, allowing the file, archiving the file, logging the event, blocking the user and so on. However, if no match is found in the DLP sensor filter, then the file is passed through the gateway 104.

Figure 12:
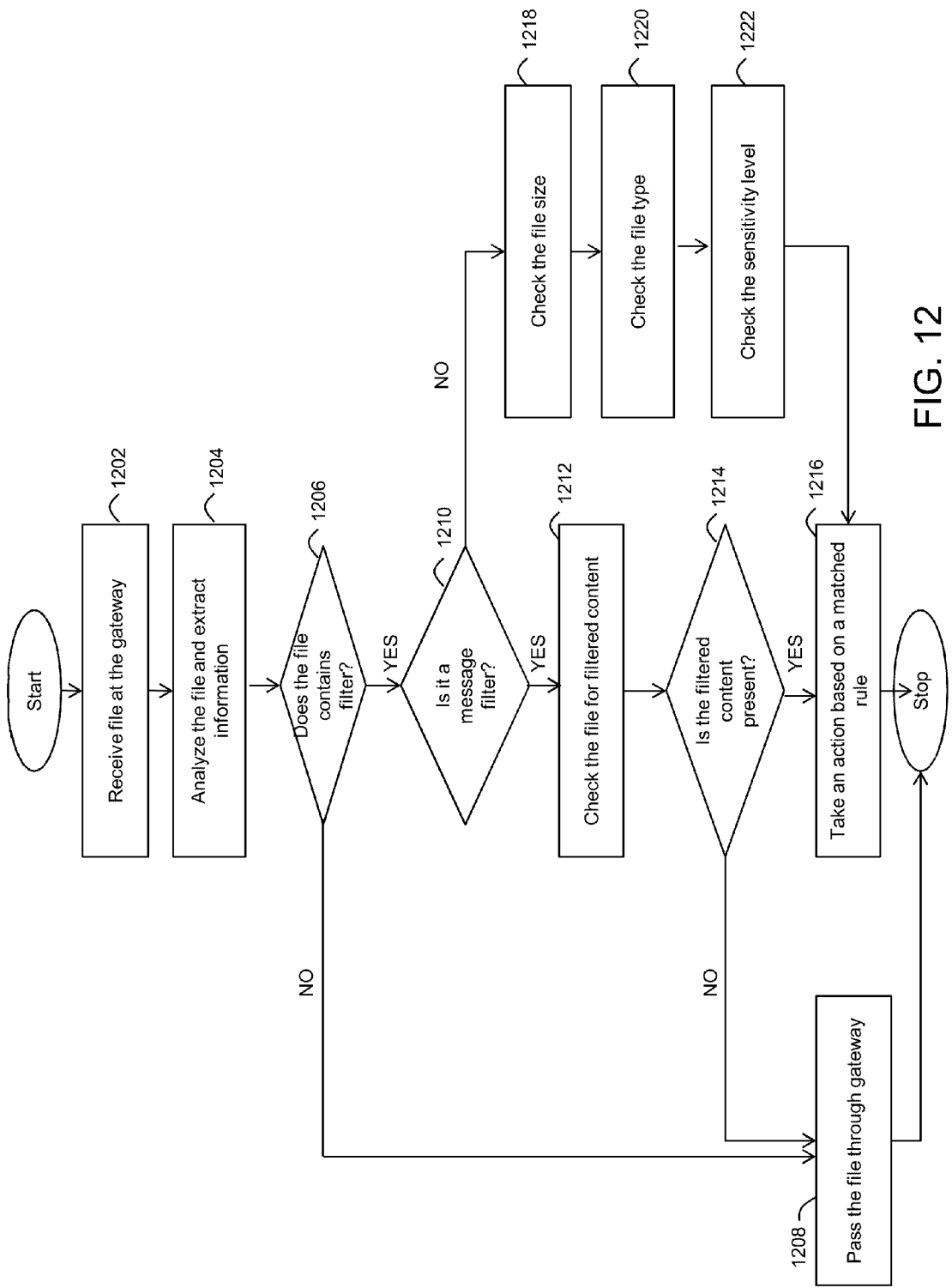
FIG. 12 is a flow diagram illustrating a method for implementing a filter at a DLP sensor, in accordance with an embodiment of the present invention.

FIG. 12 is a flow diagram illustrating a method for implementing a filter at a DLP sensor, in accordance with an embodiment of the present invention. At block 1202, a file is received at the gateway 104. The watermark detection module 210 analyzes the file at block 1204 for any filters associated with the document type of the file. At block 1206, it is determined if a filter is associated. If no filter is associated, then at block 1208, the file is allowed to pass through the gateway 104. However, if it is found that a filter is associated with the file then at block 1210, it is determined if the filter is a message filter.

If a message filter is present, then at block 1212, the file is analyzed for the presence of any filtered content. During this process the DLP sensor checks the message in the file to contain some specific words such as Credit Card #, SSN, Regex, and the like, as defined in FIG. 9. At block 1214, if it is determined that filtered content is present, then at block 1216, an action is taken according to the defined rule (as explained in FIG. 9). However, if at block 1214, it is determined that no filtered content is present, then the file is allowed to pass through the gateway 104 without any intervention.

At block 1210, if it is determined that it is not a message filter, then at block 1218, the file is checked for its size. Further at block 1220, the file is checked for a file type, for example all_executable, all_archives (see, e.g., FIG. 10). Furthermore, at block 1222, the file is checked for the sensitivity level detected in its watermark. Based on these parameters detected, a comparison is made to a DLP sensor filter database. When a match is found, an action is taken by the gateway 104 depending on the match. The action includes blocking the file, allowing the file to pass, logging the event, archiving the file, exemption, and the like.

Figure 13:
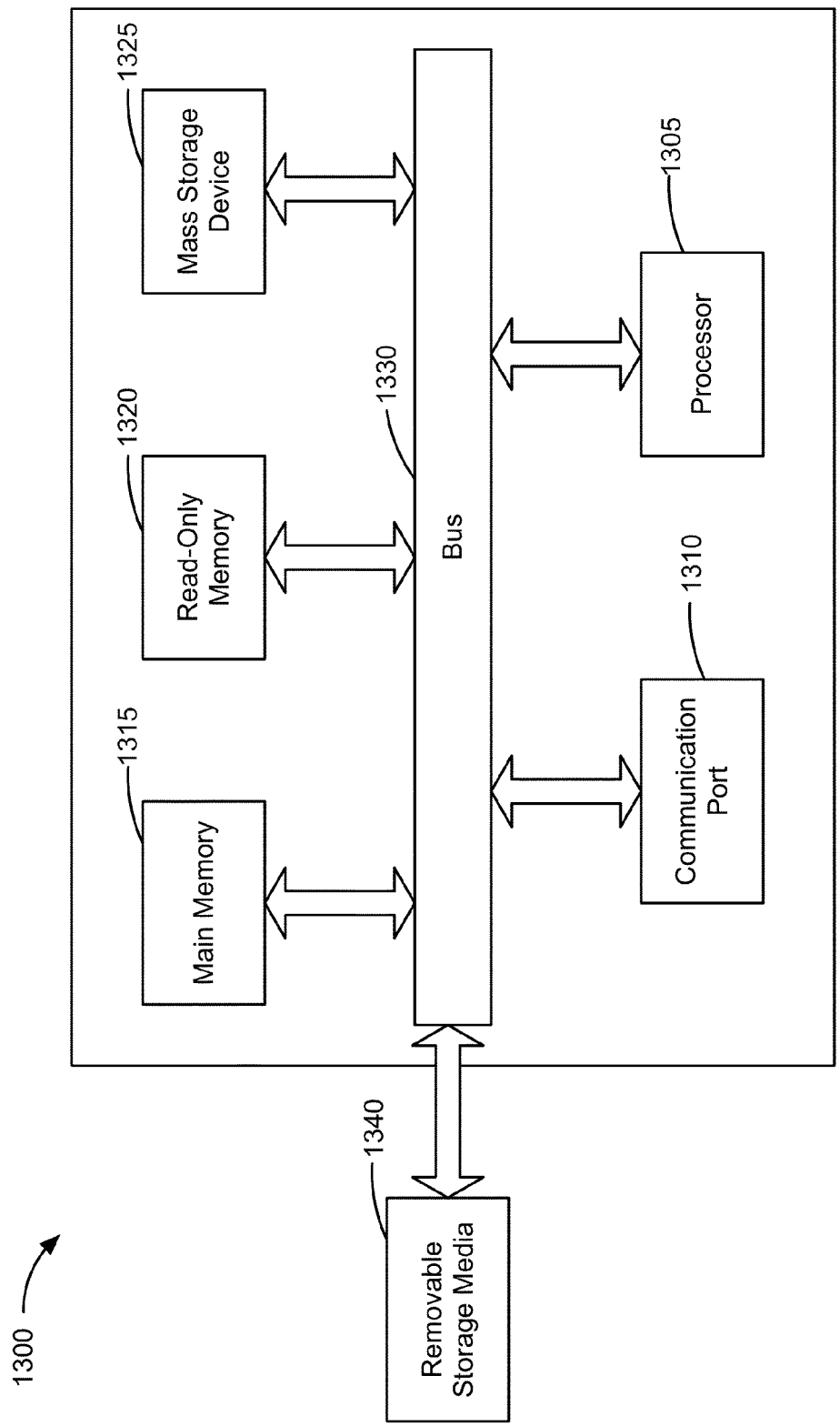
FIG. 13 is an exemplary computer system with which embodiments of the present invention may be utilized.

FIG. 13 is an example of a computer system 1300 with which embodiments of the present disclosure may be utilized. Computer system 1300 may represent or form a part of a network gateway, a firewall, a network appliance, a switch, a bridge, a router, data storage devices, a server, a client workstation and/or other network devices in a network.

Embodiments of the present invention include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1300 includes a bus 1330, a processor 1305, communication port 1310, a main memory 1315, a removable storage media 1340, a read only memory 1320 and a mass storage 1325. A person skilled in the art will appreciate that computer system 1300 may include more than one processor and communication ports.

Examples of processor 1305 include, but are not limited to, an Intel® Itanium® or Itanium 2 processor(s), or AMD®, Opteron® or Athlon MP® processor(s), Motorola® lines of processors, FortiSOC™ system on a chip processors or other future processors. Processor 1305 may include various modules associated with monitoring unit as described in FIG. 2. Processor 1305 may include resource communication module 220 for establishing communication with resources coupled to the network. Processor 1305 may further include policy module 225 for including various policies and scoring schemes. In addition, processor 1305 may include reputation module 230 for generating reputation of the resources coupled to the network.

Communication port 1310 can be any of an RS-232 port for use with a modem based dialup connection, a 10/100 Ethernet port, a Gigabit or 10 Gigabit port using copper or fiber, a serial port, a parallel port, or other existing or future ports. Communication port 1310 may be chosen depending on a network, such a Local Area Network (LAN), Wide Area Network (WAN), or any network to which computer system 1300 connects.

Memory 1315 can be Random Access Memory (RAM), or any other dynamic storage device commonly known in the art. Read only memory 1320 can be any static storage device(s) such as, but not limited to, a Programmable Read Only Memory (PROM) chips for storing static information such as start-up or BIOS instructions for processor 1305.

Mass storage 1325 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1330 communicatively couples processor(s) 1305 with the other memory, storage and communication blocks. Bus 1330 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1305 to system memory.

Optionally, operator and administrative interfaces, such as a display, keyboard, and a cursor control device, may also be coupled to bus 1330 to support direct operator interaction with computer system 1300. Other operator and administrative interfaces can be provided through network connections connected through communication port 1310.

Removable storage media 1340 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A data leak protection method comprising:
receiving, by a network filtering device, via a graphical user interface (GUI) of the network filtering device information regarding a watermark filtering rule, including a plurality of filtering parameters, including a file size threshold, an indication regarding one or more file types and a sensitivity level, and an action to be taken by the network filtering device when files observed by the network device satisfy the plurality of filtering parameters of the watermark filtering rule;
scanning, by the network filtering device, a file attempted to be passed through the network filtering device, by locating a watermark embedded within the file and identifying a file type and a size of the file;
comparing (i) a sensitivity level associated with the watermark to the sensitivity level of the watermark filtering rule; (ii) the identified file size to the file size threshold of the watermark filtering rule; and (iii) the identified file type to the indication regarding one or more file types of the watermark filtering rule, wherein the sensitivity level is selected from a group comprising critical sensitivity, high sensitivity, medium sensitivity and low sensitivity; and
if the comparing results in a determination that all of the plurality of filtering parameters are satisfied by the file and the watermark embedded therein, then performing, by the network filtering device, the action specified by the watermark filtering rule.

2. The method of claim 1, wherein the information regarding the watermark filtering rule includes a company identifier.

3. The method of claim 1, further comprising, prior to said scanning, a separate client program, embedding the watermark into the file responsive to the file being identified as a file to be protected.

4. The method of claim 3, further comprising receiving, by the separate client program, watermark content, including information regarding a sensitivity level of the file and a company identifier.

5. The method of claim 4, further comprising:
identifying, by the separate client program, a file type of the file; and
wherein said embedding the watermark into the file is based upon the file type.

6. The method of claim 4, further comprising generating, by the separate client program, the watermark based on the watermark content.

7. The method of claim 6, wherein the watermark comprises a hash value or a message digest of the watermark content.

8. The method of claim 6, wherein the watermark comprises a plain text representation of the watermark content.

9. The method of claim 1, wherein the network filtering device comprises a gateway.

10. The method of claim 5, wherein the file type is one of a text document, a Portable Document Format (PDF) document, a Microsoft Windows Office document, an open office document, and a Macintosh OS document.

11. The method of claim 1, wherein the action specified by the watermark filtering rule comprises blocking the file at the network filtering device.

12. The method of claim 1, wherein the action specified by the watermark filtering rule comprises passing the file through the network filtering device.

13. The method of claim 1, wherein the file is attached to an electronic mail (email) message or is being transferred via a file transfer protocol from a source device to a destination device.

14. The method of claim 13, wherein the action specified by the watermark filtering rule comprises logging information regarding one or more of a user associated with the source device, an Internet Protocol (IP) address associated with the source device, a time, a date and an interface of the network filtering device on which the file was received.

15. A non-transitory program storage device readable by a network filtering device, tangibly embodying a program of instructions executable by one or more computer processors of the network filtering device to perform a method of data leak protection, the method comprising:
receiving, via a graphical user interface (GUI) of the network filtering device, information regarding a watermark filtering rule, including a plurality of filtering parameters, including a file size threshold, an indication regarding one or more file types and a sensitivity level, and an action to be taken by the network filtering device when files observed by the network device satisfy the plurality of filtering parameters of the watermark filtering rule;
scanning a file attempted to be passed through the network filtering device, by locating a watermark embedded within the file and identifying a file type and a size of the file;
comparing (i) a sensitivity level associated with the watermark to the sensitivity level of the watermark filtering rule; (ii) the identified file size to the file size threshold of the watermark filtering rule; and (iii) the identified file type to the indication regarding one or more file types of the watermark filtering rule, wherein the sensitivity level is selected from a group comprising critical sensitivity, high sensitivity, medium sensitivity and low sensitivity; and if the comparing results in a determination that all of the plurality of filtering parameters are satisfied by the file and the watermark embedded therein, then performing, by the network filtering device, the action specified by the watermark filtering rule.

16. The program storage device of claim 15, wherein the information regarding the watermark filtering rule includes a company identifier.

17. The program storage device of claim 15, wherein prior to said scanning, a separate client program, embeds the watermark into the file responsive to the file being identified as a file to be protected.

18. The program storage device of claim 17, wherein the separate client program, receives watermark content, including information regarding a sensitivity level of the file and a company identifier.

19. The program storage device of claim 18, wherein the separate client program:
identifies a file type of the file; and
embeds the watermark into the file is based upon the file type.

20. The program storage device of claim 19, wherein the separate client program generates the watermark based on the watermark content.

21. The program storage device of claim 20, wherein the watermark comprises a hash value or a message digest of the watermark content.

22. The program storage device of claim 20, wherein the watermark comprises a plain text representation of the watermark content.

23. The program storage device of claim 15, wherein the network filtering device comprises a gateway.

24. The program storage device of claim 19, wherein the file type is one of a text document, a Portable Document Format (PDF) document, a Microsoft Windows Office document, an open office document, and a Macintosh OS document.

25. The program storage device of claim 15, wherein the action specified by the watermark filtering rule comprises blocking the file at the network filtering device.

26. The program storage device of claim 15, wherein the action specified by the watermark filtering rule comprises passing the file through the network filtering device.

27. The program storage device of claim 15, wherein the file is attached to an electronic mail (email) message or is being transferred via a file transfer protocol from a source device to a destination device.

28. The program storage device of claim 27, wherein the action specified by the watermark filtering rule comprises logging information regarding one or more of a user associated with the source device, an Internet Protocol (IP) address associated with the source device, a time, a date and an interface of the network filtering device on which the file was received.

29. A data leak protection method comprising:
receiving, by a network filtering device, via a graphical user interface (GUI) of the network filtering device information regarding a watermark filtering rule, including a plurality of filtering parameters, including a file size threshold, an indication regarding one or more file types and a sensitivity level, and an action to be taken by the network filtering device when files observed by the network device satisfy the plurality of filtering parameters of the watermark filtering rule;

scanning, by the network filtering device, a file attempted to be passed through the network filtering device, by locating a watermark embedded within the file and identifying a file type and a size of the file;

comparing (i) a sensitivity level associated with the watermark to the sensitivity level of the watermark filtering rule; (ii) the identified file size to the file size threshold of the watermark filtering rule; and (iii) the identified file type to the indication regarding one or more file types of the watermark filtering rule;

if the comparing results in a determination that all of the plurality of filtering parameters are satisfied by the file and the watermark embedded therein, then performing, by the network filtering device, the action specified by the watermark filtering rule;

wherein the file is attached to an electronic mail (email) message or is being transferred via a file transfer protocol from a source device to a destination device; and wherein the action specified by the watermark filtering rule comprises logging information regarding one or more of a user associated with the source device, an Internet Protocol (IP) address associated with the source device, a time, a date and an interface of the network filtering device on which the file was received.

30. The method of claim 29, wherein the information regarding the watermark filtering rule includes a company identifier.

31. The method of claim 29, further comprising, prior to said scanning, a separate client program, embedding the watermark into the file responsive to the file being identified as a file to be protected.

32. The method of claim 31, further comprising receiving, by the separate client program, watermark content, including information regarding a sensitivity level of the file and a company identifier.

33. The method of claim 32, further comprising:
identifying, by the separate client program, a file type of the file; and
wherein said embedding the watermark into the file is based upon the file type.

34. The method of claim 32, further comprising generating, by the separate client program, the watermark based on the watermark content.

35. The method of claim 34, wherein the watermark comprises a hash value or a message digest of the watermark content.

36. The method of claim 34, wherein the watermark comprises a plain text representation of the watermark content.

37. The method of claim 29, wherein the sensitivity level is selected from a group comprising critical sensitivity, high sensitivity, medium sensitivity, and low sensitivity.

38. The method of claim 29, wherein the network filtering device comprises a gateway.

39. The method of claim 33, wherein the file type is one of a text document, a Portable Document Format (PDF) document, a Microsoft Windows Office document, an open office document, and a Macintosh OS document.

40. The method of claim 29, wherein the action specified by the watermark filtering rule comprises blocking the file at the network filtering device.

41. The method of claim 29, wherein the action specified by the watermark filtering rule comprises passing the file through the network filtering device.

42. A non-transitory program storage device readable by a network filtering device, tangibly embodying a program of instructions executable by one or more computer processors of the network filtering device to perform a method of data leak protection, the method comprising:
- receiving, via a graphical user interface (GUI) of the network filtering device, information regarding a watermark filtering rule, including a plurality of filtering parameters, including a file size threshold, an indication regarding one or more file types and a sensitivity level, and an action to be taken by the network filtering device when files observed by the network device satisfy the plurality of filtering parameters of the watermark filtering rule;
- scanning a file attempted to be passed through the network filtering device, by locating a watermark embedded within the file and identifying a file type and a size of the file;
- comparing (i) a sensitivity level associated with the watermark to the sensitivity level of the watermark filtering rule; (ii) the identified file size to the file size threshold of the watermark filtering rule; and (iii) the identified file type to the indication regarding one or more file types of the watermark filtering rule;
- if the comparing results in a determination that all of the plurality of filtering parameters are satisfied by the file and the watermark embedded therein, then performing, by the network filtering device, the action specified by the watermark filtering rule;
- wherein the file is attached to an electronic mail (email) message or is being transferred via a file transfer protocol from a source device to a destination device; and
- wherein the action specified by the watermark filtering rule comprises logging information regarding one or more of a user associated with the source device, an Internet Protocol (IP) address associated with the source device, a time, a date and an interface of the network filtering device on which the file was received.

43. The program storage device of claim 42, wherein the information regarding the watermark filtering rule includes a company identifier.

44. The program storage device of claim 42, wherein prior to said scanning, a separate client program, embeds the watermark into the file responsive to the file being identified as a file to be protected.

45. The program storage device of claim 44, wherein the separate client program, receives watermark content, including information regarding a sensitivity level of the file and a company identifier.

46. The program storage device of claim 45, wherein the separate client program:
- identifies a file type of the file; and
- embeds the watermark into the file is based upon the file type.

47. The program storage device of claim 45, wherein the separate client program generates the watermark based on the watermark content.

48. The program storage device of claim 47, wherein the watermark comprises a hash value or a message digest of the watermark content.

49. The program storage device of claim 47, wherein the watermark comprises a plain text representation of the watermark content.

50. The program storage device of claim 42, wherein the sensitivity level is selected from a group comprising critical sensitivity, high sensitivity, medium sensitivity, and low sensitivity.

51. The program storage device of claim 42, wherein the network filtering device comprises a gateway.

52. The program storage device of claim 46, wherein the file type is one of a text document, a Portable Document Format (PDF) document, a Microsoft Windows Office document, an open office document, and a Macintosh OS document.

53. The program storage device of claim 42, wherein the action specified by the watermark filtering rule comprises blocking the file at the network filtering device.

54. The program storage device of claim 42, wherein the action specified by the watermark filtering rule comprises passing the file through the network filtering device.

* * * * *